G. W. HARLAN.
Carriage Springs.
No. 142,627. Patented September 9, 1873.
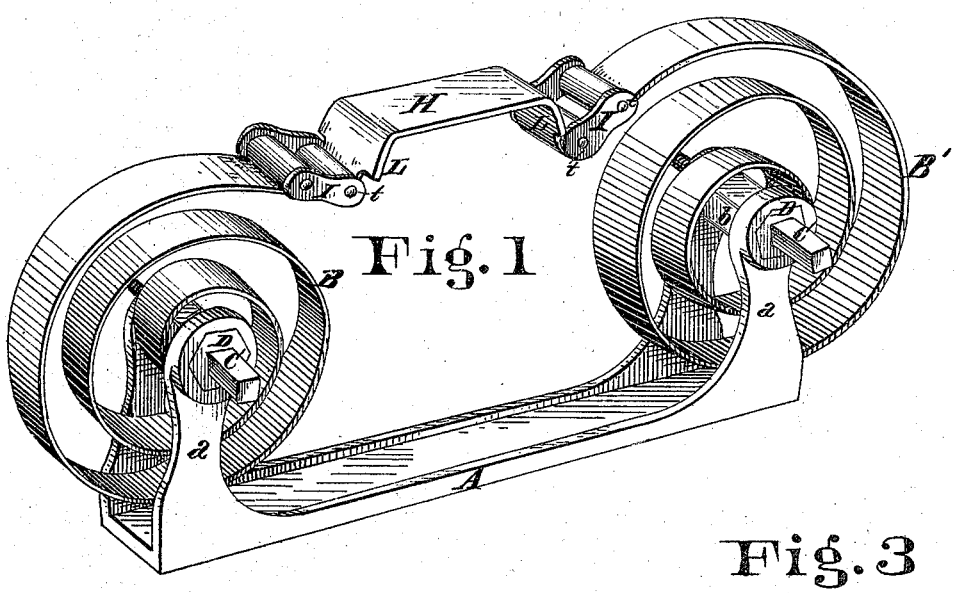
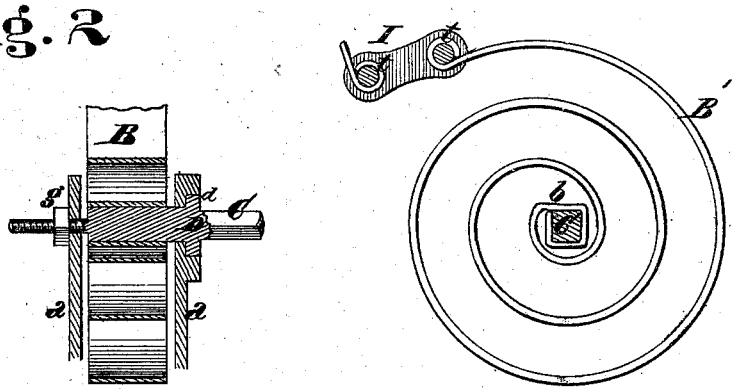

UNITED STATES PATENT OFFICE.

GEORGE W. HARLAN, OF CINCINNATI, OHIO.

IMPROVEMENT IN CARRIAGE-SPRINGS.

Specification forming part of Letters Patent No. 142,627, dated September 9, 1873; application filed January 9, 1873.

*To all whom it may concern:*

Be it known that I, GEORGE W. HARLAN, of Cincinnati, in the county of Hamilton and State of Ohio, have invented certain Improvements in Carriage-Springs, of which the following is a specification:

My invention relates to an improvement in carriage-springs, adapted to the use of all kinds of vehicles; and consists in constructing and arranging scroll-springs in such a manner that the weight of the carriage and its load will tend to coil or wind up the spring, and that it will uncoil or loosen as the load is diminished. My invention also consists in providing means to make the springs more or less stiff or taut, as the weight which they are required to bear is greater or less, so that the elasticity of the springs may be increased or decreased, as occasion may require; the object of my invention being to so arrange the springs that the weight and strain upon them will be with, instead of across, the grain of the metal, thereby decreasing the amount of material necessary, and at the same time increasing its durability.

Figure 1 is a perspective view of my improvement. Fig. 2 is a vertical section of one end of the same. Fig. 3 is a plan of one of the springs with the link attachment.

A represents the carriage axle or gear, to which the brackets are attached; and $a\ a$, brackets, which support the springs a sufficient distance above the axle or gear to allow of a free movement of the springs. B B' represent scroll-springs, which should be made of steel; and $b\ b$, square eyes, through which bolts C C pass to connect the springs to brackets $a\ a$. These bolts C C also act as pivots or shafts to support and hold the springs rigidly in a fixed position at the inner end of the coil. D D represent bolt-heads, which may be made with any number of sides, and which fit into recesses of a corresponding shape, as shown in Fig. 2. The bolts are tightened by nuts $g\ g$ upon the opposite ends to the heads. H represents a coupling-arm, connected at each end to springs B B' by means of links I I, which have shackle-joints at each end, so as to allow them to change position as the coupling H rises and falls, and also to allow the coupling-bar and the springs to move in their respective planes as nearly as possible. The springs are tightened or loosened by unscrewing the tap-nuts $g\ g$, and withdrawing the bolt-heads D D out of the recesses $d\ d$ sufficiently to allow bolts C C to turn and coil or uncoil the springs, when the bolts are again put back into place and the nuts $g\ g$ tightened up. A pawl and ratchet might be employed to tighten and loosen the springs, but would be inferior to the plan here shown.

One of the objects of my invention being to avoid having any strain across the grain of the metal of the spring, it is important and necessary, in order to accomplish that object, that the curve of the outer end of the spring shall be concentric with the inner coils.

My arrangement of the coupling-bar H, links I I, and springs B B' is such that the springs move in curved lines, while the coupling-bar descends in a vertical plane, the links changing position on the two pivot-bearings $t\ t$ to accommodate this movement. By having the metal of the springs of a uniform curve below the two outer attaching ends, the strain will be equally distributed over the entire length of the spring, which would not be the case if some parts were not curved or the curves not uniform.

It is necessary to employ two springs united by a coupling-bar and shackle-jointed links to form one operative device. Two or more of these may be employed for a carriage; or they can be arranged in pairs side by side, or at right angles to each other.

What I claim as my invention, and desire to secure by Letters Patent, is—

The combination of the adjustable scroll-springs B B', links I I, pivots $t\ t$, coupling-rod H, standards or support $a$, bearings D D, and bolts C C, all constructed and arranged to operate substantially as described.

In testimony whereof I have hereunto set my hand this 7th day of January, 1873.

GEO. W. HARLAN.

Witnesses:
 JOHN O. GARA,
 EDWARD BOYD.